US011627031B2

(12) United States Patent
Makovsky et al.

(10) Patent No.: US 11,627,031 B2
(45) Date of Patent: Apr. 11, 2023

(54) TRANSFORMATION AND TRANSMISSION OF EVENT MESSAGES

(71) Applicant: ServiceNow, Inc., Santa Clara, CA (US)

(72) Inventors: Bnayahu Makovsky, Savyon (IL); Adar Margalit, Modlin (IL)

(73) Assignee: ServiceNow, Inc., Santa Clara, CA (US)

( * ) Notice: Subject to any disclaimer, the term of this patent is extended or adjusted under 35 U.S.C. 154(b) by 332 days.

(21) Appl. No.: 16/694,254

(22) Filed: Nov. 25, 2019

(65) Prior Publication Data

US 2020/0162308 A1 May 21, 2020

Related U.S. Application Data

(63) Continuation of application No. 15/490,396, filed on Apr. 18, 2017, now Pat. No. 10,516,565.

(51) Int. Cl.
*G06F 15/16* (2006.01)
*H04L 41/046* (2022.01)
*H04L 41/06* (2022.01)
*H04L 41/22* (2022.01)
*H04L 41/0663* (2022.01)
*H04L 67/51* (2022.01)

(52) U.S. Cl.
CPC ............ *H04L 41/046* (2013.01); *H04L 41/06* (2013.01); *H04L 41/0663* (2013.01); *H04L 41/22* (2013.01); *H04L 67/51* (2022.05)

(58) Field of Classification Search
None
See application file for complete search history.

(56) References Cited

U.S. PATENT DOCUMENTS

| 6,321,229 | B1 | 11/2001 | Goldman |
| 6,609,122 | B1 | 8/2003 | Ensor |
| 6,799,189 | B2 | 9/2004 | Huxoll |
| 6,816,898 | B1 | 11/2004 | Scarpelli |

(Continued)

OTHER PUBLICATIONS

ServiceNow, ServiceNow Documentation, "Event Collection Via Script", Send events via cURL, Date Unknown, downloaded Mar. 23, 2017, https://docs.servicenow.com/bundle/geneva-it-operations-management/page/product/event_ management/concept/c _ EMIntegrationEvent.html, 6 pp.

(Continued)

*Primary Examiner* — Phuoc H Nguyen
(74) *Attorney, Agent, or Firm* — Fletcher Yoder PC

(57) ABSTRACT

Messages indicative of events are transmitted from a computer network to a management system using an agent device. The agent device receives a web service event collector from the management system. The web service event collector includes event message transformation instructions and an endpoint definition. After the web service event collector is initialized, an event message transmitted from an event source is received using the web service event collector. The event message indicates an event associated with the computer network. Using the event message transformation instructions, the event message is transformed into a format usable by the management system. The transformed event message is then transmitted to the management system.

19 Claims, 8 Drawing Sheets

(56) References Cited

U.S. PATENT DOCUMENTS

| | | |
|---|---|---|
| 6,895,586 B1 | 5/2005 | Brasher |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,152,094 B1 * | 12/2006 | Jannu ............... G06F 9/541 |
| | | 709/206 |
| 7,170,864 B2 | 1/2007 | Matharu |
| 7,350,209 B2 | 3/2008 | Shum |
| 7,392,300 B2 | 6/2008 | Anantharangachar |
| 7,609,400 B2 * | 10/2009 | Kuroda ............... G06F 3/1205 |
| | | 358/1.1 |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,224,683 B2 | 7/2012 | Manos |
| 8,266,096 B2 | 9/2012 | Navarette |
| 8,380,645 B2 | 2/2013 | Kowalski |
| 8,457,928 B2 | 6/2013 | Dang |
| 8,478,569 B2 | 7/2013 | Scarpelli |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,887,133 B2 | 11/2014 | Behnia |
| 9,015,188 B2 | 4/2015 | Behne |
| 9,037,536 B2 | 5/2015 | Vos |
| 9,137,115 B2 | 9/2015 | Mayfield |
| 9,239,857 B2 | 1/2016 | Non |
| 9,323,801 B2 | 4/2016 | Morozov |
| 9,411,839 B2 * | 8/2016 | Goldberg ............... G06F 16/22 |
| 9,412,084 B2 | 9/2016 | Kowalski |
| 9,467,344 B2 | 10/2016 | Gere |
| 9,535,737 B2 | 1/2017 | Joy |
| 9,613,070 B2 | 4/2017 | Kumar |
| 9,659,051 B2 | 5/2017 | Hutchins |
| 9,705,993 B1 | 7/2017 | Asghari et al. |
| 9,792,387 B2 | 10/2017 | George |
| 9,852,165 B2 | 12/2017 | Morozov |
| 10,002,203 B2 | 6/2018 | George |
| 2006/0212879 A1 * | 9/2006 | Bennetto ............... G06F 16/24 |
| | | 719/328 |
| 2007/0168464 A1 * | 7/2007 | Noonan ............... G16H 10/60 |
| | | 709/218 |
| 2012/0179767 A1 | 7/2012 | Clarke et al. |
| 2012/0197963 A1 * | 8/2012 | Bouw ............... G06F 16/258 |
| | | 709/202 |
| 2012/0215860 A1 * | 8/2012 | Bohner ............... G16H 10/60 |
| | | 709/206 |
| 2013/0191185 A1 * | 7/2013 | Galvin ............... G06Q 10/10 |
| | | 705/7.37 |
| 2014/0082513 A1 | 3/2014 | Mills et al. |
| 2015/0046555 A1 | 2/2015 | Cohen |
| 2015/0271271 A1 | 9/2015 | Bullotta et al. |
| 2015/0271299 A1 | 9/2015 | Bullotta et al. |
| 2015/0310423 A1 * | 10/2015 | Desai ............... G06Q 20/10 |
| | | 705/44 |
| 2016/0020917 A1 | 1/2016 | Tuatini et al. |
| 2016/0087925 A1 | 3/2016 | Kalavagattu et al. |
| 2016/0269343 A1 | 9/2016 | Li et al. |
| 2017/0099332 A1 | 4/2017 | Bullotta et al. |
| 2017/0351989 A1 * | 12/2017 | Langdon ............ G06Q 10/06315 |
| 2018/0173812 A1 * | 6/2018 | Agarwal ............... G06F 16/254 |
| 2019/0235862 A1 * | 8/2019 | Douglas ............... G06F 8/44 |
| 2019/0251146 A1 * | 8/2019 | Finn ............... G06F 16/9027 |
| 2019/0362347 A1 * | 11/2019 | Swaminathan .... G06Q 10/0833 |

OTHER PUBLICATIONS

ServiceNow, ServiceNow Documentation, "Event Collection Via Web Service API", Date Unknown, Downloaded Mar. 23, 2017, https://docs.servicenow.com/bundle/geneva-it-operations-management/page/product/event_management/task/send-events-via-web-service.html, 6 pp.

ServiceNow, ServiceNow Documentation, "Event Collection Via MID Server", Date Unknown, Downloaded Mar. 23, 2017, https://docs.servicenow .com/bu ndle/geneva-it-operations-management/page/prod uct/event_ management/concept/c_EMConnectorManagement.html, 18 pp.

* cited by examiner

TRANSFORMATION AND TRANSMISSION OF EVENT MESSAGES

CROSS-REFERENCE TO RELATED APPLICATION(S)

This is a continuation application of U.S. patent application Ser. No. 15/490,396, filed Apr. 18, 2017, which is hereby incorporated by reference in its entirety.

BACKGROUND

An electronic computing and communications system can process information using software executing on servers at a datacenter. The software can include functionality for managing the status or configuration of hardware or software components of a computer network. For example, the software can notify an administrator or like user of the computer network upon the occurrence of events associated with those hardware or software components.

SUMMARY

Disclosed herein are implementations of systems and techniques for transformation and transmission of event messages.

In an implementation, a system is provided for transmitting messages indicative of events from a computer network. The system comprises a memory and a processor. The memory is configured to store one or more processor-executable routines. The processor is configured to communicate with the memory and to execute the routines stored in the memory. The routines, when executed, cause the system to receive, from a management system, a web service event collector including event message transformation instructions and an endpoint definition. The routines, when executed, further cause the system to initialize the web service event collector. The routines, when executed, further cause the system to receive, using the web service event collector, an event message transmitted from an event source. The event message indicates an event associated with the computer network. The routines, when executed, further cause the system to transform, using the event message transformation instructions, the event message into a format usable by the management system. The routines, when executed, further cause the system to transmit the transformed event message to the management system.

In an implementation, a method is provided for transmitting messages indicative of events from a computer network. The method comprises receiving, from a management system, a web service event collector including event message transformation instructions and an endpoint definition. The method further comprises initializing the web service event collector. The method further comprises receiving, using the web service event collector, an event message transmitted from an event source. The event message indicates an event associated with the computer network. The method further comprises transforming, using the event message transformation instructions, the event message into a format usable by the management system. The method further comprises transmitting the transformed event message to the management system.

In an implementation, a non-transitory computer-readable storage medium is provided comprising processor-executable routines that, when executed by a processor, facilitate a performance of operations of a management system. The operations comprise transmitting a web service event collector to an agent device within a computer network. The web service event collector includes event message transformation instructions and an endpoint definition. The operations further comprise receiving a transformed event message from the agent device. The transformed event message indicates an event associated with the computer network and is in a format usable by the management system. The transformed event message was created by the agent device using the event message transformation instructions and an event message received from an event source. The operations further comprise determining, based on the transformed event message, an effect of the event on one or more components of the computer network.

These and other aspects of this disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
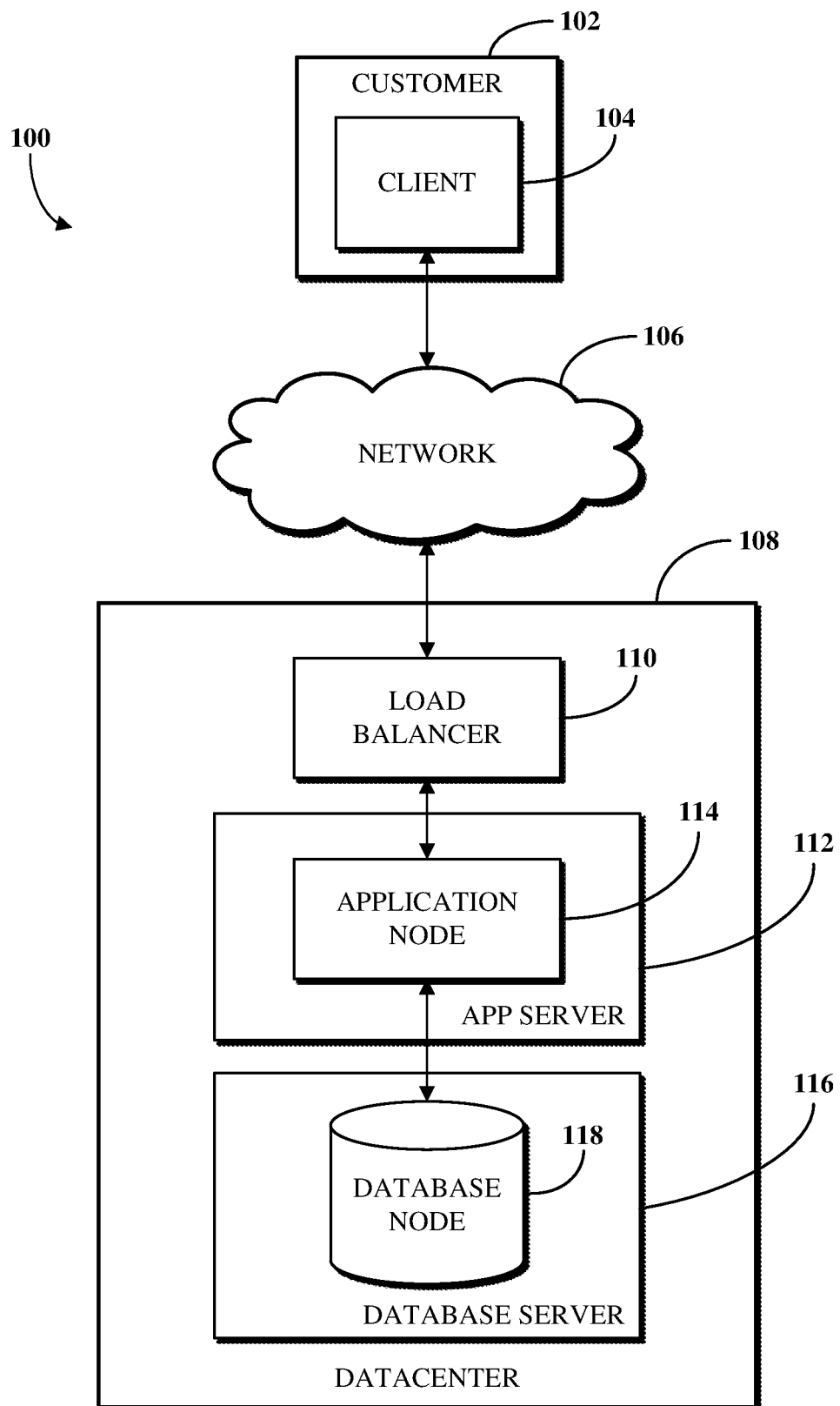
FIG. 1 is a block diagram of an example of an electronic computing and communications system.

Monitoring tools can be used to identify events occurring within a computer network, such as by monitoring the status or configuration of the computer network from a server external to the computer network. An event is a notification of the state or change in state of hardware or software associated with a computer network. For example, an event can indicate a physical attribute of a device, such as CPU temperature, CPU usage, CPU speed, memory usage, disk usage, disk speed, and the like. In another example, an event can indicate information associated with software, such as the status of a process executing on a device, a number of semaphores, and the like. An event can indicate a logged message, warning, or error associated with the computer network. For example, an event can indicate that a database record has been inserted into a table associated with a component of the computer network, updated within that table, or deleted from that table.

Software, for example, an instance of platform software implemented by a Platform-as-a-Service (PaaS) computing provider, can be used to manage the status and configuration of a computer network. The instance of platform software can process data indicative of an event, such as an event message, received from an event source (e.g., a monitoring tool). For example, the instance of platform software can use the event message to generate an alert reflecting a change in status or configuration of a component of the computer network. However, there may be event sources that cannot access the instance of platform software. For example, an event source operating within a private network may not have access to the Internet or another network used to transmit data to the instance of platform software.

Further, protocols, data formats, or other aspects of the event sources may change, or new event sources may become available. For example, the instance of platform software may not be configured to process event messages that are transmitted using a new protocol. In another example, the instance of platform software may not be able to parse event messages received from a new event source that uses a data format the instance of platform software is not configured to process. These event messages may not be processed by the instance of platform software and may be discarded. This may result in the instance of platform software reflecting an inaccurate state of one or more components of the computer network, such as where events associated with the unprocessed event messages affect a status or configuration of those components.

Implementations of this disclosure address problems such as those described above by using a web service event collector to configure an extensible agent device within a computer network to receive event messages, transform event messages into a format usable by a management system (which may, for example, include an instance of platform software) and transmit the transformed event messages to the management system. The agent device receives the web service event collector from the management system. The web service event collector includes event message transformation instructions and an endpoint definition. After the web service event collector is initialized, an event message transmitted from an event source is received using the web service event collector. The event message indicates an event associated with the computer network. Using the event message transformation instructions, the event message is transformed into a format usable by the management system. The transformed event message is then transmitted to the management system.

Implementations of this disclosure provide technological improvements particular to computer networks, for example, those concerning the transmission of event messages between event sources and a management system. Computer network-specific technological problems such as those can be wholly or partially solved by implementations of this disclosure. For example, implementations of this disclosure include a web service event collector configured to receive event messages from event sources. The web service event collector opens a port of an agent device on which the web service event collector runs to receive the event messages. Event message transformation instructions of the web service event collector are used to process the event messages before transmitting them to the management system, such as by transforming the event messages into a format usable by the management system. Implementations of this disclosure can thus introduce new and efficient improvements in the ways in which events are processed for computer networks, such as by using agent devices to process event messages from event sources to permit the receipt of and use of event messages by the management system, such as where a protocol or data format used by an event source changes or an event source is unable to directly access the management system. The transformation of event messages on the agent device may include the additional benefit of restricting access to certain types of data that may be transmitted from an event source. For example, certain data may be filtered out of an event message received at the agent device before it is transmitted to the management system.

Figure 2:
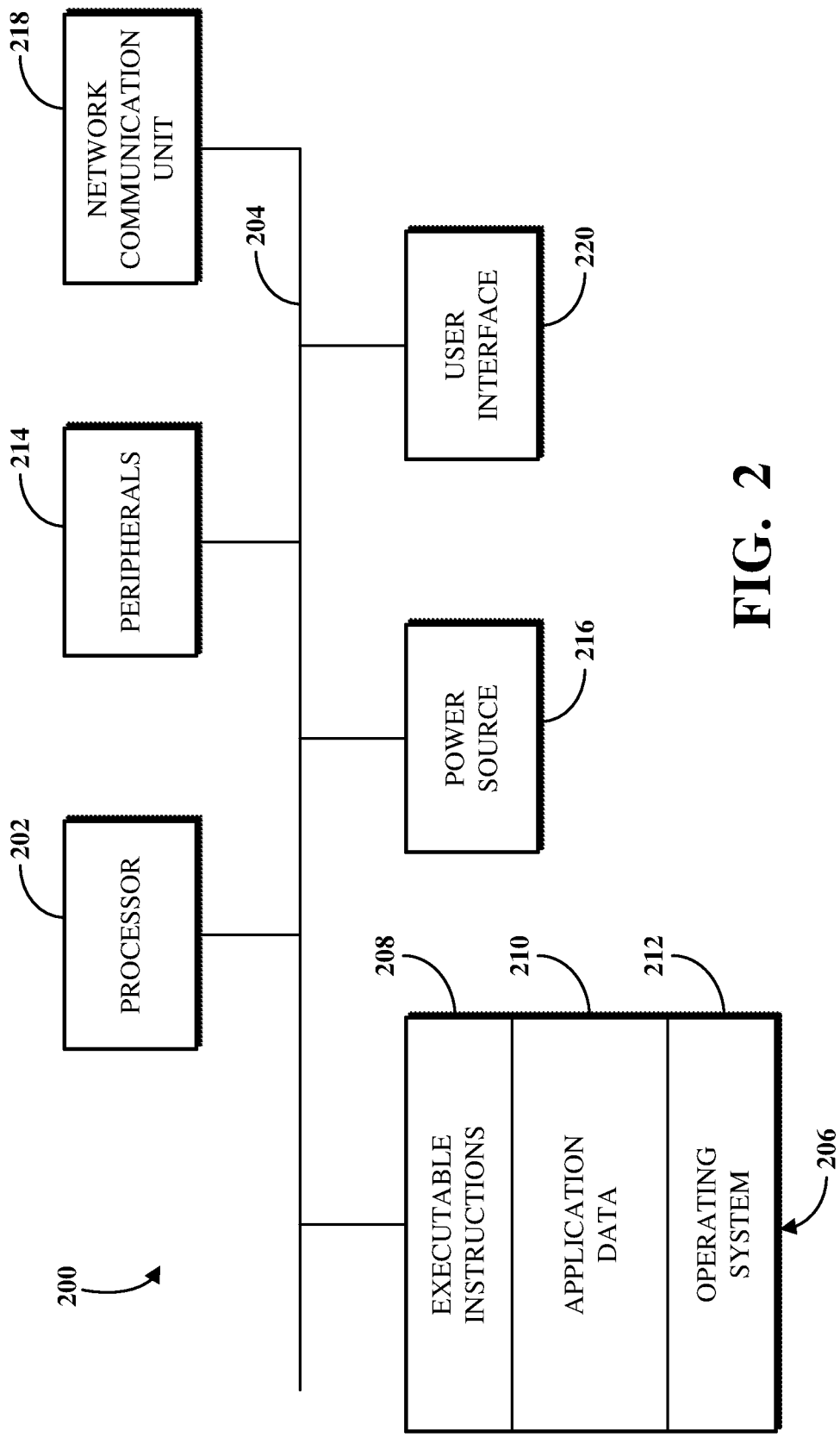
FIG. 2 is a block diagram of an example internal configuration of a computing device of an electronic computing and communications system.

As used herein, the term "component" can refer to a hardware component (e.g., infrastructure, such as a switch, router, server, modem, processor, I/O interface, memory or storage, power supply, biometric reader, media reader, or the like, or combinations thereof) or a software component (e.g., software, such as a platform application, module, routine, firmware process, or other instructions executable by or in connection with one or more hardware components, or the like, or combinations thereof). A component can also refer to a computing feature such as a document, model, plan, socket, virtual machine, or the like, or combinations thereof. A component, such as a hardware component or a software component, can refer to a physical implementation (e.g., a computing device, such as shown in FIG. 2) or a virtual implementation (e.g., a virtual machine, container, or the like that can, for example, execute on a physical device and mimic certain characteristics of a physical device) of one or more of the foregoing.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or software provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as a database node 118 executing on the database server 116.

The application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. The database server 116 may include a data storage unit, such as the database node 118, which can be accessible by software executed on the application node 114. A database implemented by the database node 118 may be a relational database management system (RDBMS), an object database, an XML database, a configuration management database (CMDB), a management information base (MIB), one or more flat files, other suitable non-transient storage mechanisms, or a combination thereof. By way of non-limiting example, the system 100, in some implementations, can include an XML database and a CMDB. While limited examples are described, a database implemented using the database node 118 can be configured as or comprise any suitable database type. Further, the system 100 can include one, two, three, or any suitable number of databases configured as or comprising any suitable database type or combination thereof.

In some implementations, a database implemented using the database node 118 can be configured as or comprise a CMDB. A CMDB can comprise a plurality of configuration items (CIs), attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database node 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MM.

One or more databases (e.g., implemented using the database node 118), tables, other suitable information sources, or portions or combinations thereof may be stored, managed, or otherwise provided by one or more of the elements of the system 100 other than the database server 116, such as the client 104 or the application server 112.

In some implementations, a customer instance, which may also be referred to as an instance of platform software, can be implemented using one or more application nodes 114 and one or more database nodes 118. For example, the one or more application nodes 114 can implement a version of the platform software, and databases implemented by the one or more database nodes 118 can store data used by the version of the platform software. The customer instance associated with the customer 102 may be different from a customer instance associated with another customer. For example, the one or more application nodes and databases used to implement the platform software and associated data of a first customer may be different from the one or more application nodes and databases used to implement the platform software and associated data of a second customer. In some implementations, multiple customer instances can use one database node 118, such as wherein the database node 118 includes separate catalogs or other structure for separating the data used by platform software of a first customer and platform software of a second customer.

Some or all of the systems and techniques described herein can operate or be executed on or by the servers associated with the system 100. For example, one or more application nodes 114 and one or more database nodes 118 can implement a management system that transmits a web service event collector to an agent device within a computer network. In some implementations, the systems and techniques described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as implemented by the database node 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a software service to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, which can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data, routines, or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data, routines, or instructions for processing by the processor 202. The processor 202 can access or manipulate data in the memory 206 via the bus 204.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into routines, programmable modules or algorithms, functional programs, codes, code segments, or combinations thereof to perform various functions described herein.

For example, the executable instructions 208 can include instructions to receive a web service event collector from a management system, initialize the web service event collector, receive an event message transmitted from an event source using the web service event collector, transform the event message into a format usable by the management system, and transmit the transformed event message to the management system.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
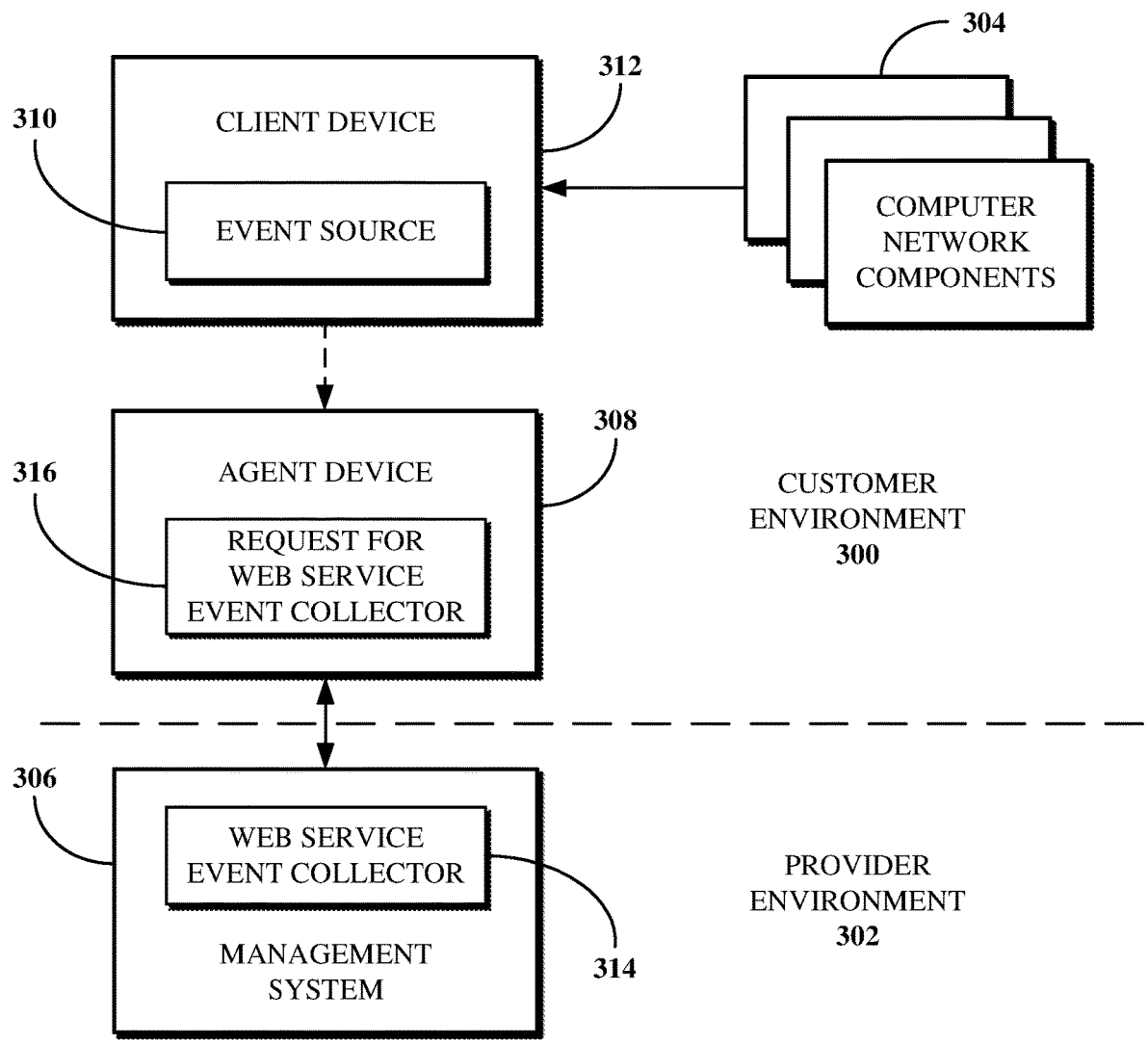
FIG. 3 is a block diagram of an example of a system for receiving, transforming, and transmitting event messages.

FIG. 3 is a block diagram of an example of a system for receiving, transforming, and transmitting event messages. The system includes a customer environment 300 and provider environment 302. The customer environment 300 can refer to, for example, the customer 102 shown in FIG. 1. The customer environment 300 can include one or more computer networks. The customer environment 300 can include hardware and software components under the partial or total control of the customer, such as computer network components 304.

The computer network components 304, or other components under the partial or total control of the customer environment 300, can be hardware devices operating at a physical location controlled by the customer, software executing on such a hardware device, software executing on another device operating at physical locations not controlled by the customer (e.g., cloud services executing on server devices of a third-party Software-as-a-Service (SaaS) computing provider environment), virtual machines implementing software, or the like, or a combination thereof.

The provider environment 302 includes software and hardware controlled by a computing provider, such as a PaaS or SaaS computing provider. The provider environment 302 can refer to, for example, the datacenter 108 shown in FIG. 1, servers operating at the datacenter 108, software executing on the servers, or the like, or a combination thereof. The provider environment 302 includes a management system 306 that can be used to manage one or more computer networks of the customer environment 300. For example, the management system 306 can include hardware and/or software components for implementing one or more Information Technology Service Management (ITSM) tools, Information Technology Operations Management (ITOM) tools, or the like, or combinations thereof.

The functionality of the management system 306 can be provided as part of a PaaS or SaaS computing service implemented by components of the provider environment 302, on-premises components within the customer environment 300, or a combination thereof. For example, the management system 306 can include an instance of platform software executed within the provider environment 302. The instance of platform software can be implemented, for example, using one or more application nodes or database nodes, such as the application node 114 or the database node 118 shown in FIG. 1.

The customer environment 300 can be bounded by firewalls, routers, or other devices that separate customer-controlled networks and devices from external networks and devices, such as connections to the Internet or components controlled by third parties. For example, the customer environment 300 can include a firewall that prevents components of the provider environment 302 from accessing components of the customer environment 300. As such, the customer environment 300 includes an agent device 308 for facilitating the communication and movement of data between hardware operating or software executing outside of the customer environment 300 (e.g., outside of a computer network of the customer environment 300) and hardware operating or software executing within the customer environment 300. The agent device 308 is a computing device, for example, the computing device 200 shown in FIG. 2.

Agent software executing on the agent device 308 can permit communication between components of the provider environment 302 and the customer environment 300, for example, by initiating a connection from within the customer environment 300 to the provider environment 302 using an HTTP protocol permitted by a firewall of the customer environment 300. The agent device 308 can thus be used for operations directed by the management system 306 within the customer environment 300, such as for processing events associated with the customer environment 300. For example, once the connection between the customer environment 300 and the provider environment 302 is opened, data can be transmitted from the agent device 308 to the management system 306 or from the management system 306 to the agent device 308.

The agent device 308 receives events associated with a computer network of the customer environment 300 from event sources associated with the computer network, such as an event source 310. The event source 310 can for example be a monitoring tool that identifies and/or collects the events, such as by monitoring ones of the computer network components 304. Examples of the event source 310 can include, but are not limited to, Netcool®/OMNIbus® ObjectServers and Impact Servers, Microsoft® System Center Operations Manager servers, and Solarwinds® Log & Event Manager servers. The event source 310 can for example be software that can generate event messages and transmit such event messages to a web service, such as by using an endpoint provided by a web service event collector as described herein. The event source 310 may be hosted on a client device 312 of the customer environment 300, for example, where the event source 310 is a software component. The client device 312 can be a computing device, such as the computing device 200 shown in FIG. 2. Alternatively, the event source 310 may be a client device.

The event source 310 may be restricted from accessing the management system 306. For example, the event source 310 may not have access to the Internet or another network used to communicate with the management system 306. For example, event source may be on a network subnet without access to the internet or the computer network may be configured to prevent the event source 310 from accessing or being accessed from the Internet (and/or the management system 306). The event source 310 may establish a connection to the agent device 308 for transmitting event messages to the agent device 308 (e.g., established using an endpoint of the web service event collector 314, described below with respect to FIG. 4). The agent device 308 can then use the Internet or another network to transmit the event messages to the management system 306.

The agent device 308 can open a connection to the management system 306 of the provider environment 302. The agent device 308 can use the open connection to transmit data indicative of the events received from the event source 310, such as event messages, to the management system 306. For example, the agent device 308 can push an event message received from the event source 310 to the management system 306 for processing, such as without first receiving a request for the events from the management system 306.

The web service event collector 314 may be transmitted to the agent device 308 from the management system 306. For example, the web service event collector 314 may be available on a computing device on which the management system 306 executes, such as a server device of the provider environment 302. The management system 306 can cause the transmission of the web service event collector 314 to the agent device 308 responsive to receiving a request 316 for the web service event collector from the agent device 308.

For example, transmitting the request 316 from the agent device 308 to the management system 306 can include opening a connection between the agent device 308 and the management system 306, such as where the connection has not yet been opened.

Once transmitted to the agent device 308, the web service event collector 314 can process event messages from event sources, such as to prepare event messages for use by the management system 306. For example, the web service event collector 314 can be a plugin, patch, configuration, or like component used by agent software executing on the agent device 308. The web service event collector 314 includes functionality or configuration to receive event messages from the event source 310 and transform the event messages into a format usable by the management system 306. For example, the event source 310 may transmit event messages in a format different from a format usable by the management system 306. As such, the management system 306, in a default configuration, may be unable to parse the format in which the event messages are received. The web service event collector 314 may thus improve the functionality of the management system 306, such as by transmitting event messages in a format usable by the management system 306 to determine how events associated with those event messages may affect a computer network of the customer environment 300.

Implementations of the system depicted in FIG. 3 can include additional, less, or combined functionality as compared to that described above, or functionality other than that described above, or combinations thereof. In some implementations, the web service event collector 314 may be transmitted to the agent device 308 from a computing device other than the one on which the management system 306 executes. In some implementations, the web service event collector 314, once initialized on the agent device 308, may be configured to transmit event messages to the management system 306.

In some implementations, the management system 306 can include functionality for transmitting the agent software of the agent device 308 to the agent device 308. For example, the agent software can be transmitted to the agent device 308 responsive to a request received from the computer network (e.g., from a client of the computer network in communication with the management system 306). For example, the agent software can be available on the computing device on which the management system 306 executes. In another example, the agent software can be transmitted to the agent device 308 using a store portal, such as described above. In yet another example, the agent software can be transmitted to the agent device 308 using a server device different from the computing device on which the management system 306 or a store portal executes.

In some implementations, the management system 306 can include functionality of a Representational State Transfer (ReST) application programming interface (API) for storing event messages received from the agent device 308. For example, the management system 306 can specify a ReST endpoint associated with a database or like table used to store an event message until it is processed, for example, to determine an effect of an event associated with transformed event message on one or more of the computer network components 304.

In some implementations, there may be multiple agent devices operating within the customer environment 300. For example, there may be multiple agent devices within one computer network of the customer environment 300. For example, there may be a first agent device and a second agent device. In such implementations, communications between the management system 306 and one of the first agent device or the second agent device may be controlled using a router. For example, the router may be a load balancer, such as the load balancer 110 shown in FIG. 1.

Figure 4:
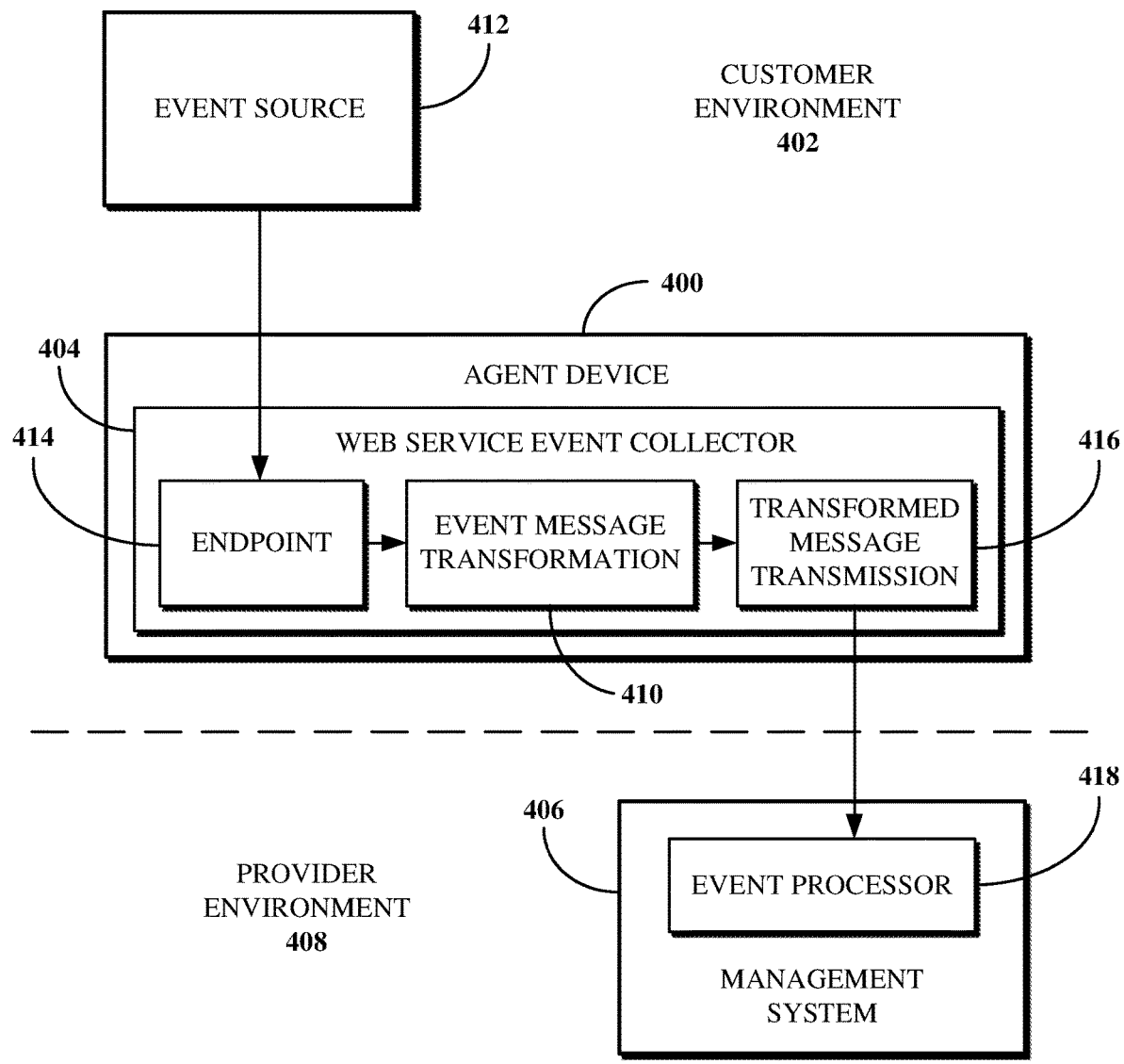
FIG. 4 is a block diagram of an example of a system for transmitting messages indicative of events from a computer network.

FIG. 4 is a block diagram of an example of a system for transmitting messages indicative of events from a computer network. The system includes an agent device 400 that may, for example, be the agent device 308 shown in FIG. 3. The agent device 400 operates within a customer environment 402, which may, for example, by the customer environment 300 shown in FIG. 3. The agent device 400 includes a web service event collector 404 for transmitting event messages associated with a computer network of the customer environment 300 to a management system 406 of a provider environment 408. The management system 406, and the provider environment 408 may, for example, respectively be the management system 306 and the provider environment 302 shown in FIG. 3. The web service event collector 404 may, for example, be the web service event collector 314 shown in FIG. 3 after the web service event collector 314 is initialized by the agent device 400.

The web service event collector 404 includes an endpoint definition and event message transformation instructions 410. The event message transformation instructions 410 are used to transform event messages into a format usable by the management system 406. For example, the web service event collector 404 can transform event messages received from an event source 412, which may, for example, be the event source 310 shown in FIG. 3. The event source 412 may, for example, be a client device, such as the client device 312 shown in FIG. 3.

The web service event collector 404 may use the endpoint definition to create or otherwise initialize an endpoint 414, for example, during initialization of the web service event collector 404 by the agent device 400. The web service event collector 404 uses the endpoint 414 to receive event messages from the event source 412. The endpoint definition can specify user permissions for the web service event collector 404. For example, the endpoint definition can include a definition of an authorized user, a password for authenticating the user, or the like, or a combination thereof. The endpoint definition can be configured at the management system 406, for example, before the web service event collector is transmitted to the agent device 400. In the event the endpoint definition is not manually configured (e.g., by an administrator of the customer environment 402), the management system 406 can automatically configure the endpoint definition.

The endpoint 414 can be associated with a web service type. For example, the endpoint 414 can be a ReST endpoint, a Simple Object Access Protocol (SOAP) endpoint, a proprietary endpoint, or the like. For example, the endpoint 414 can be an endpoint of a ReST API. The ReST API can be an event management API defined at the management system 406. The event management API can be registered, such as to the agent device 400, upon receipt of the web service event collector 404 by the agent device 400.

The endpoint definition includes a reference to one or more resources used to receive event messages from the event source 412. For example, the endpoint definition can specify a port of the agent device 400 used by the endpoint 414. The port, for example, can be a TCP/IP port that enables receipt of messages at a particular IP address. Alternatively, the port can refer to another protocol or network mechanism for addressing messages to a network device. In another example, the endpoint definition can specify a uniform resource identifier (URI). The URI can, for example, be a web address accessible by the web service event collector 404. For example, the endpoint definition can specify that event messages are received by the web service event collector at a particular URI (e.g., http://agentdevice_ipaddress:port/api/agent/eventmanagement/webserviceeventcollector). As such, the endpoint 414 can be a mechanism for facilitating communications using a URI and an HTTP/HTTPS or like port. The endpoint 414 can use objects, functions, or other elements of an API (e.g., a ReST API) to access the resources indicated in the endpoint definition.

The web service event collector 404 can be initialized on the agent device 400 after it is received by the agent device 400 from the management system 406. Initializing the web service event collector 404 can include opening a port of the agent device 400 according to the endpoint definition. Initializing the web service event collector 404 can also include installing, executing, or otherwise running the web service event collector 404. For example, where the web service event collector 404 is a plugin for agent software of the agent device 400, the plugin can be installed automatically upon receipt by the agent device 400 or manually, such as by a user of the agent device 400. For example, when the agent device 400 includes web server software, the web service event collector 404 can include configuring the web server software to receive and respond to HTTP requests on a port and path (e.g., URI) specified by the endpoint definition. The received HTTP requests can be processed using the web service event collector 404.

The agent device 400 receives event messages transmitted from the event source 412 using the web service event collector 404. For example, an event message can be transmitted using a ReST format or protocol and received using objects or functionality of a ReST API (e.g., using the endpoint 414). The web service event collector 404 can use the endpoint 414 to passively receive event messages from the event source 412. For example, the event source 412 can push event messages to the web service event collector 404. As such, the passive receipt of event messages using the endpoint 414 enables the web service event collector 404 to dynamically receive event messages from the event source 410 whenever the event source 412 transmits the event messages (subject, for example, to technical capabilities of the event source 412, the agent device 400, a network used for communication between the event source 412 and the agent device 400, or the like). One or more event messages can be received from the event source 412 by the web service event collector 404 at a given time (subject to the technical capabilities of the event source 412, the web service event collector 404, the agent device 400, or the like).

The web service event collector 404 can store the received event messages in a queue for processing (e.g., using the event message transformation instructions 410). For example, the queue can be implemented using a database table available to the agent device 400. The database table can be an event management table extended to include data indicative of event messages. For example, the table extension can include fields for storing a size of an event message, a number of event messages included in a batch (described below), an identifier of the web service event collector 404, or the like.

The event message transformation instructions 410 of the web service event collector 404 are used to transform event messages into a format usable by the management system 406. The event message transformation instructions 410, when executed on the agent device 400, can transform an event message from a format used by the event source 412 to a format used by the management system 406. For example, event messages received from the event source 412 may be formatted according to a markup language, such as the eXtensible Markup Language (XML). However, the management system 406, in a default configuration, may be unable to parse event messages that are in XML format (or other formats as may be used by the event source 412). For example, the management system 406 may, in the default configuration, be able to parse event messages that are in an object format, such as the JavaScript Object Notation (JSON) format. As such, the event message transformation instructions 410, when executed, can transform an event message from an XML format to a JSON format.

For example, the event message transformation instructions 410 can forward an event message to be transformed to a particular URI (e.g., http://agentdevice_ipaddress:port/api/agent/eventmanagement/transformevents_xml). The URI can receive the event message as a text variable. A script of the event message transformation instructions 410 executing at the URI can include a function that performs the transformation of the event message into the format usable by the management system 406. For example, the script can return an array of objects, such as in a JSON format. The event message transformation instructions 410 may add the objects of the array into a queue, such as to prepare the transformed event message for transmission to the management system 406.

The transformed event messages are then be transmitted to the management system 406. For example, the agent device 400 can use a transformed message transmission module 416 of the web service event collector 404 to transmit a transformed event message to an event processor 418 of the management system 406. The transformed message transmission module 416 can transmit the transformed event message using an open connection between the agent device 400 and the management system 406.

The event processor 418 processes a transformed event message by determining an effect of an event associated with the transformed event message on one or more components of a computer network of the customer environment 402. For example, the event processor 418 can use event rules defined at the management system 406 to generate an alert based on the event associated with the transformed event message. An event rule can indicate how to convert all or a portion of a transformed event message into an alert for the customer environment 402. For example, an alert generated by the event processor 418 can indicate a computer network issue to be resolved based on the event associated with the transformed event message.

Implementations of the system depicted in FIG. 4 can include additional, less, or combined functionality as compared to that described above, or functionality other than that described above, or combinations thereof. In some implementations, the event source 412 can transmit a batch event message to the web service event collector 404. For example, the event source 412 can add event messages to be transmitted to the web service event collector 404 to a queue. Once a message threshold is met (e.g., where the queue includes more than a defined number of event messages), the event source 412 can transmit the event messages in a batch. In another example, the event source 412 may receive event messages from one or more other event sources. The event source 412 can communicate a batch event message from the event source 412 and those or other event sources to the web service event collector 404, for example, once a message threshold is met.

In some implementations, the format to which the web service event collector 404 transforms event messages (e.g., using the event message transformation instructions 410) can be configured for the customer environment 402. For example, the management system 406 may include functionality for processing event messages using one or more second formats. An administrator or other user of the customer environment 402 can be permitted to extend the web service event collector 404 by creating or modifying the event message transformation instructions 410. For example, the administrator or other user may be provided with a graphical user interface generated by the management system 406. The graphical user interface may permit the administrator or other user to author a script included in the event message transformation instructions 410, for example, to create or edit the event message transformation instructions 410. The web service event collector 404 may be enhanced by permitting user creation or modification of the event message transformation instructions 410, such as by extending the types of event sources that can be handled by the web service event collector 404.

In some implementations, the management system 406 can transmit an update for the web service event collector 404 to the agent device 400 to configure the web service event collector 404 to process event messages using a new format. For example, the web service event collector 404 by default may not be able to process event messages formatted using the new format. The management system 406 can transmit an update including instructions for transforming event messages received in the new format to the agent device 400. For example, the management system 406 can transmit the update for the web service event collector 404 after identifying a new event source that uses the new format, a user of the customer environment 402 modifies the event message transformation instructions 410 or creates additional event message transformation instructions, or the like. Transmitting an update for the web service event collector 404 can include transmitting a new web service event collector configured with the instructions for transforming event messages received in the new format.

In some implementations, the web service event collector 404 can include instructions to identify certain types of data within an event message received from the event source 412 and remove those data before transmitting a corresponding transformed event message to the management system 406. For example, an event message received from the event source 412 may include sensitive or other information not intended to be shared outside of a network including the event source 412. For example, the event message can include an IP address of a component associated with an event, a password for authenticating access to the component, or other sensitive information. The web service event collector 404 can remove the IP address, password, or other sensitive information before transforming the event message using the event message transformation instructions 410. Alternatively, the web service event collector 404 can remove such data after transforming the event message, but before transmitting the transformed event message to the management system 406.

In some implementations, there may be multiple agent devices (e.g., including the agent device 400) that receive the web service event collector 404. For example, the management system 406 can transmit the web service event collector 404 to a cluster of agent devices operating within the customer environment 402. Individual agent devices of the cluster can use the web service event collector 404 to receive event messages from the event source 412 or other event sources associated with the customer environment 402. For example, the event source 412 may transmit an event message to a single agent device of the cluster. In another example, the event source 412 may transmit the same event message to multiple agent devices of the cluster. In such implementations, the management system 406 can identify duplicative and delete duplicative event messages upon receipt.

In some implementations, the management system 406 can be used to test functionality of the web service event collector 404. For example, the management system 406 can transmit test event messages to the endpoint 414 to determine how the test event messages are transformed and transmitted back to the management system 406. In another example, the management system 406 can transmit the web service event collector 404 to multiple agent devices. The management system 406 can test communications with individual ones of the agent devices, for example, where those communications are controlled using a router (e.g., a load balancer, such as the load balancer 110 shown in FIG. 1). In yet another example, the management system 406 can transmit large numbers of test event messages (e.g., in one or more batches) at one time to determine a capacity of the web service event collector 404 for handling event messages before becoming experiencing processing constraints or like issues limiting its functionality.

In some implementations, an edge encryption server (not shown) or like component can encrypt all or a portion of a transformed event message before it is transmitted to the management system 406. For example, the edge encryption server can be a proxy server within the computer network of the customer environment 402. The agent device 400 can transmit a transformed event message to the edge encryption server to encrypt the transformed event message using public key encryption, tokenization, or like techniques to secure the contents of the event message. The edge encryption server can transmit the encrypted event message back to the agent device 400 before it is transmitted to the management system 406. Alternatively, the edge encryption server may be configured to transmit the encrypted event message to the management system 406.

In some implementations, the web service event collector 404 can record data indicative of its performance, such as for receiving event messages at the endpoint 414 or transforming the event messages using the event message transformation instructions 410. For example, the web service event collector 404 can transmit recorded performance data to the management system 406 (e.g., upon request or periodically, such as daily). The management system 406 can monitor performance of the web service event collector 404 using that performance data, for example, to identify changes to make to increase the effectiveness of the web service event collector 404.

In some implementations, the web service event collector 404 can receive commands associated with lifecycle actions for its operation. For example, the web service event collector 404 can receive commands to start, stop, restart, update parameters, or the like. A start command can be used to initialize the web service event collector 404, for example, by verifying that the port specified in the endpoint definition is open. A stop command can be used to cause the web service event collector 404 to discontinue receiving event messages from the event source 412. A restart command can be used to restart the web service event collector 404, for example, where it has experienced a failure. An update parameters command can be used to update the endpoint definition, the event message transformation instructions 410, or other aspects of the web service event collector 404.

In some implementations, the web service event collector 404 can validate that an event message can be processed before transforming it. For example, one or more validations can be checked for the event message. The validations for the event message can include one or more validating that the size of the event message (e.g., characters) does not exceed a limit, the format of the event message is usable by the web service event collector 404, a batch event message does not exceed a message limit, a queue of the web service event collector 404 is not full, or the like, or a combination thereof. In the event that the event message fails one or more of the validations, an HTTP or like error can be transmitted to the management system 406, for example, to indicate that an invalid event message was received from the event source 412, but not processed.

In some implementations, the web service event collector 404 can validate its initialization before receiving event messages. For example, one or more validations can be checked for the web service event collector 404. The validations for the web service event collector 404 can include validating that the agent device 400 that received the web service event collector 404 includes software for running the web service event collector (e.g., an event management application, such as may be available using the management system 406). In implementations where multiple agent devices receive the web service event collector 404 (e.g., where the management system 406 transmits the web service event collector 404 to a cluster of agent devices), the validations can include validating that each agent device of the cluster includes the software for running the web service event collector.

Figure 5:
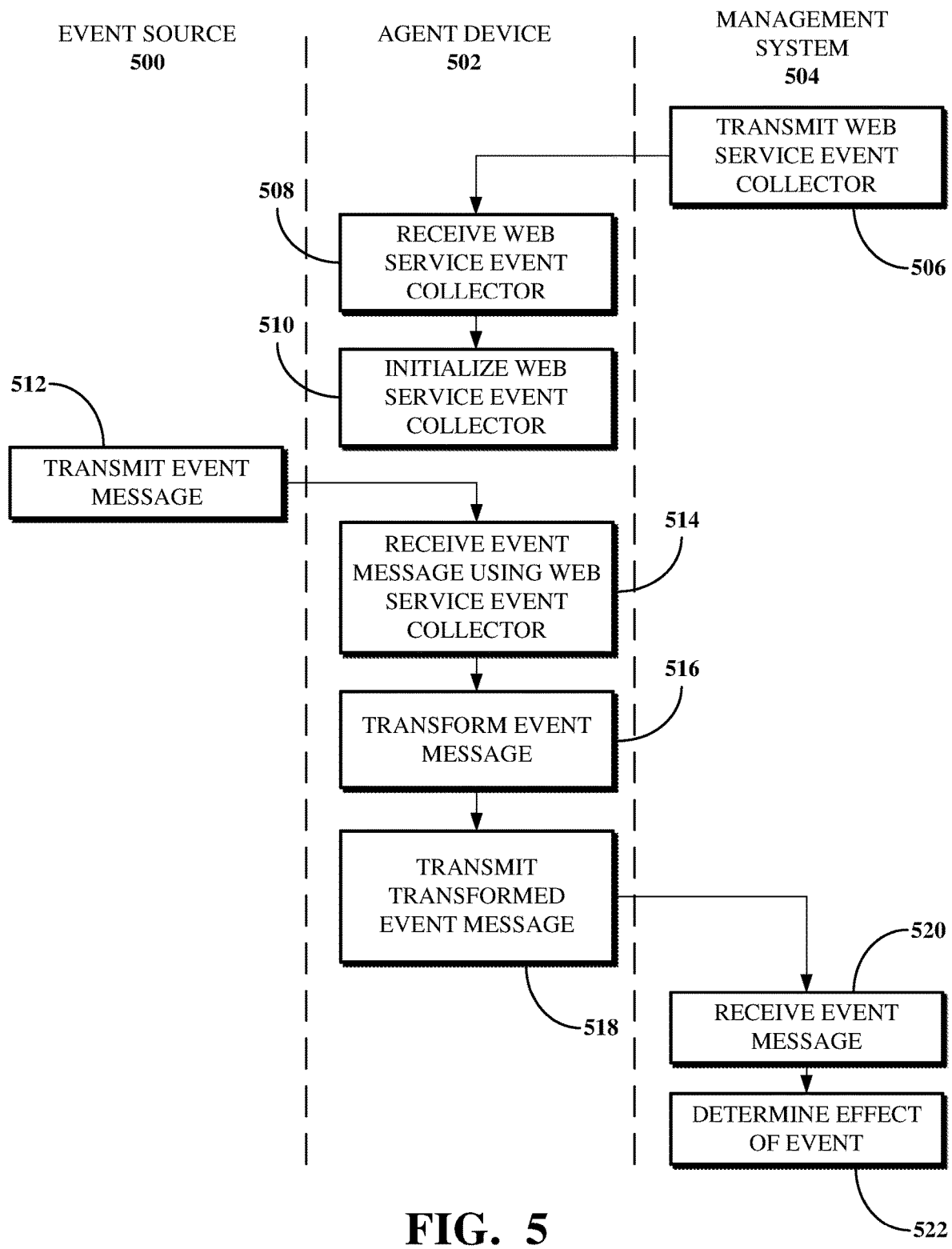
FIG. 5 is a diagram illustrating an example data exchange between an event source, an agent device, and a management system.

FIG. 5 is a diagram illustrating an example data exchange between an event source 500, an agent device 502, and a management system 504. The event source 500 can be, for example, the event source 412 shown in FIG. 4. The agent device 502 can be, for example, the agent device 400 shown in FIG. 4. The management system 504 can be, for example, the management system 406 shown in FIG. 4. The data exchange between the event source 500, the agent device 502, and the management system 504 includes a data exchange for initiating a web service event collector at the agent device 502 and a data exchange for using the web service event collector to collect an event message from an event source and transform and transmit the event message to the management system 504 for use in determining an effect of an event associated with the event message.

At 506, the web service event collector is transmitted from the management system 504 to the agent device 502. For example, the web service event collector can be transmitted to the agent device 502 responsive to a request for the web service event collector transmitted from the agent device 502. In another example, the management system 504 can retrieve the web service event collector from another computing device and relay it to the agent device at 506. At 508, the agent device 502 receives the web service event collector from the management system 504. At 510, web service event collector is initialized at the agent device 502. Initializing the web service event collector at 510 can include opening a port of the agent device specified within an endpoint definition of the web service event collector or other steps, such as those described previously.

At 512, the event source 500 transmits an event message indicative of an event associated with the computer network to the web service event collector at the agent device 502. Transmitting the event message from the event source to the web service event collector at 510 can include the event source 500 pushing the event message to an endpoint of the web service event collector. At 514, the event message transmitted from the event source 500 is received using the endpoint of the web service event collector. At 516, the received event message is transformed using event message transformation instructions of the web service event collector. For example, the event message can be transformed into a format usable by the management system 504, such as to determine an effect of an event associated with the event message. At 518, the transformed event message is transmitted from the web service event collector of the agent device 502 to the management system 504.

At 520, the management system 504 receives the transformed event message from the web service event collector of the agent device 502. At 522, the management system determines an effect of an event associated with transformed event message on one or more components of the computer network. For example, the management system 504 can processing the transformed event message using an event rule to generate an alert. The alert can include output indicative of a change in status or configuration of one or more of the components of the computer network, such as to indicate an issue to be resolved associated with those components.

Implementations of the data exchange depicted in FIG. 5 can include additional, less, or combined functionality as compared to that described above, or functionality other than that described above, or combinations thereof. In some implementations, an edge encryption server (not shown) can encrypt all or a portion of the transformed event message before it is received by the management system 504 at 520. For example, transmitting the transformed event message at 518 can include transmitting the transformed event message from the agent device 502 to the edge encryption server. The edge encryption server can encrypt the transformed event message and then transmit the encrypted event message back to the agent device 502. Alternatively, the edge encryption server can transmit the encrypted event message to the management system 504.

Figure 6:
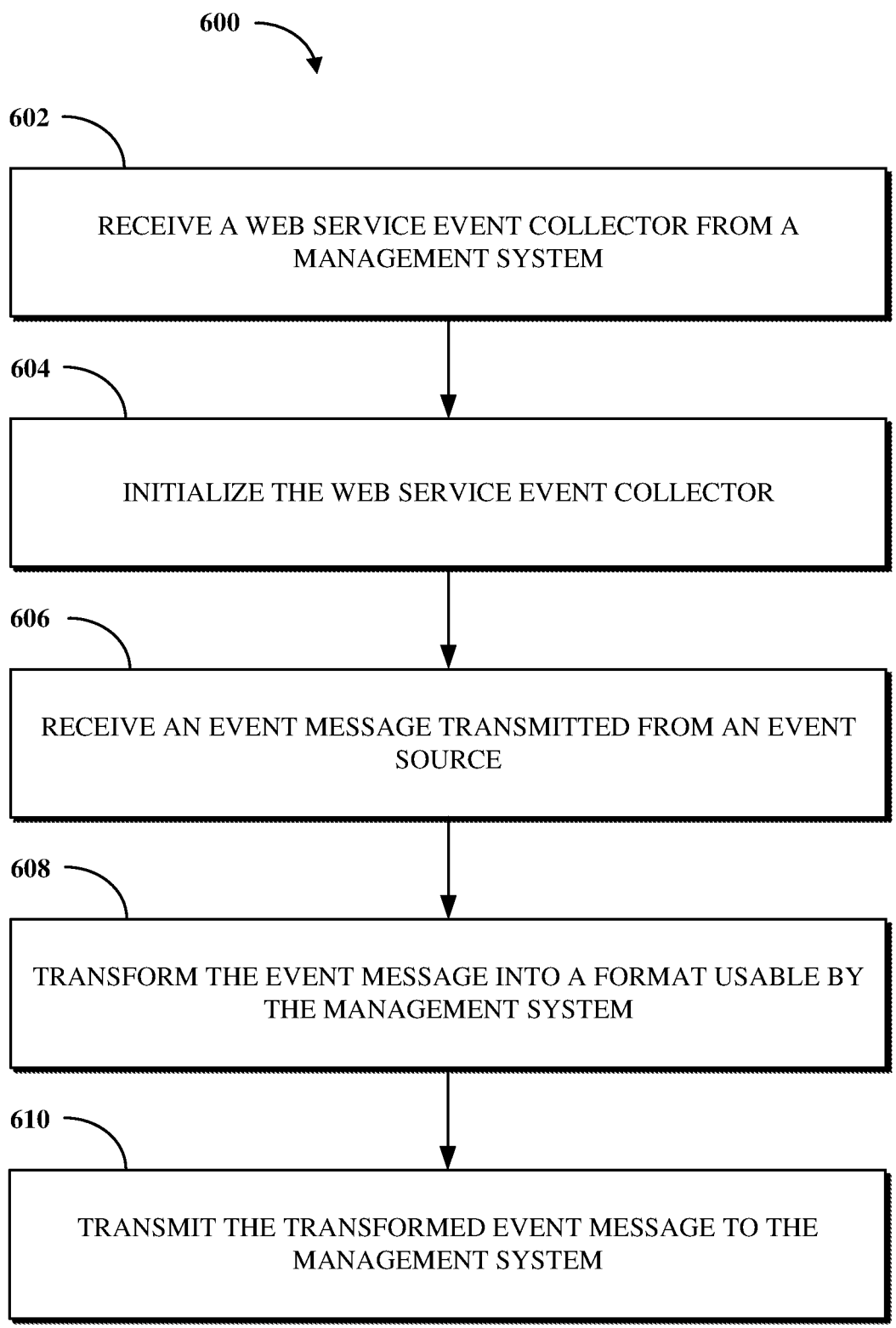
FIG. 6 is a flowchart illustrating an example of a technique for transmitting messages indicative of events from a computer network.

FIG. 6 is a flowchart illustrating an example of a technique 600 for transmitting messages indicative of events from a computer network. The technique 600 can be executed using computing devices, such as the systems, modules, and devices described with respect to FIGS. 1-5. The technique 600 can be performed, for example, by executing a machine-readable program or other computer-executable instructions, such as routines, instructions, or programs described according to JavaScript, C, or other such routines or instructions. The steps, or operations, of the technique 600 or any other technique, method, process, or algorithm described in connection with the implementations disclosed herein can be implemented directly in hardware, firmware, software executed by hardware, circuitry, or a combination thereof.

In an implementation, the technique 600 includes receiving a web service event collector from a management system via 602, initializing the web service event collector via 604, receiving an event message transmitted from an event source via 606, transforming the event message into a format usable by the management system via 608, and transmitting the transformed event message to management system via 610.

At 602, a web service event collector is received at an agent device from a management system. The management system can include an instance of platform software executed within a provider environment. The management system can transmit the web service event collector responsive to a request for the web service event collector received from the agent device. The web service event collector includes event message transformation instructions and an endpoint definition. The endpoint definition can be used to initialize an endpoint, and the endpoint can be used to receive event messages from event sources. For example, an event source can be a client device that is restricted from accessing the management system. However, the event source may transmit event messages to the agent device using an endpoint of the web service event collector. At 604, the web service event collector received at 602 is initialized at the agent device. Initializing the web service event collector can include opening a port of the agent device according to the endpoint definition of the web service event collector. The port opened according to the endpoint definition is used by the web service event collector to receive event messages from the event sources. Initializing the web service event collector may also include processing a command (e.g., received from a client device of the computer network) to start the web service event collector.

At 606, an event message transmitted from an event source is received at the agent device using the web service event collector. The event message is received using the port opened by initializing the web service event collector at 604. The event message received from the event source indicates an event associated with the computer network. The event can be associated with one or more components of the computer network. At 608, the event message received at 606 is transformed using the event message transformation instructions of the web service event collector. The event message can be transformed into a format usable by the management system.

For example, the event source from which the event message is received at 606 can transmit the event message in a format different from the format usable by the management system. The management system, in a default configuration, may be unable to parse event messages that are in the format received from the event source. For example, the event source may transmit the event messages in an XML format, however the management system may, in a default configuration, process event messages in a JSON format. As such, the event message transformation instructions of the web service event collector can be executed to transform the event message into the format usable by the management system (e.g., from an XML format to a JSON format). At 610, the transformed event message is transmitted from the web service event collector at the agent device to the management system.

Although the technique 600 is shown as a series of operations for clarity, implementations of the technique 600 or any other method, technique, process, and/or algorithm described in connection with the implementations disclosed herein can be performed in various orders and/or concurrently. Additionally, operations in accordance with this disclosure can be performed with other operations not presented and described herein. Furthermore, one or more aspects of the systems and techniques described herein can be omitted.

In some implementations, the agent device can store ones of the transformed event messages. For example, the agent device can store the event message transformed at 608 until the agent device receives confirmation of receipt of the transformed event message from the management system. In the event a connection between the agent device and the management system is disrupted (e.g., due to a power outage, network outage, hardware failure, or the like), the agent device can store the transformed event message in a cache. Once the connection has been restored, the agent device can transmit the transformed event message to the management system. The management system can then transmit a confirmation of receipt of the transformed event message to the agent device. The agent device can delete the stored transformed event message (e.g., by removing it from its cache) after that confirmation is received from the management system.

In some implementations, the technique 600 can include determining an effect of the event associated with the event message received by the web service event collector at 606. For example, after the management system receives the transformed event message transmitted at 610, the management system can determine, based on the transformed event message, an effect of the event on one or more components of the computer network. For example, the management system can include functionality for processing the transformed event message using an event rule to generate an alert. The alert can include output indicative of a change in status or configuration of one or more of the components of the computer network, such as to indicate an issue to be resolved associated with those components.

In some implementations, the technique 600 can include updating the web service event collector. For example, a new event source may be identified. The new event source may be configured to transmit event messages using a format that the web service event collector may not be configured to transform or otherwise process. The management system, after identifying the new event source, can transmit an update for the web service event collector to the agent device. The update can include instructions for transforming event messages received from the new event source. For example, an administrator or other user of the customer environment may create new or modify existing event message transformation instructions to be used to transform event messages received from the new event source. Updating the web service event collector may include the management system transmitting a new web service event collector configured with the new or modified event message transformation instructions. The update can also or instead include a new endpoint definition, for example, for initializing a new endpoint to use for receiving event messages from the new event source. The update can be installed, executed, or otherwise run at the agent device to configure the web service event collector according to the instructions of the update.

To describe some implementations in greater detail, reference is next made to examples of graphical user interfaces that receive user input to initialize a web service event collector, such as the web service event collector 404 shown in FIG. 4. A graphical user interface can comprise part of a software graphical user interface constituting data that reflect information ultimately destined for display on a hardware device. For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating a graphical user interface on a display that can be used to generate pixel information. A structured data output of one device can be provided to an input of the hardware display so that the elements provided on the hardware display screen represent the underlying structure of the output data.

Figure 7:
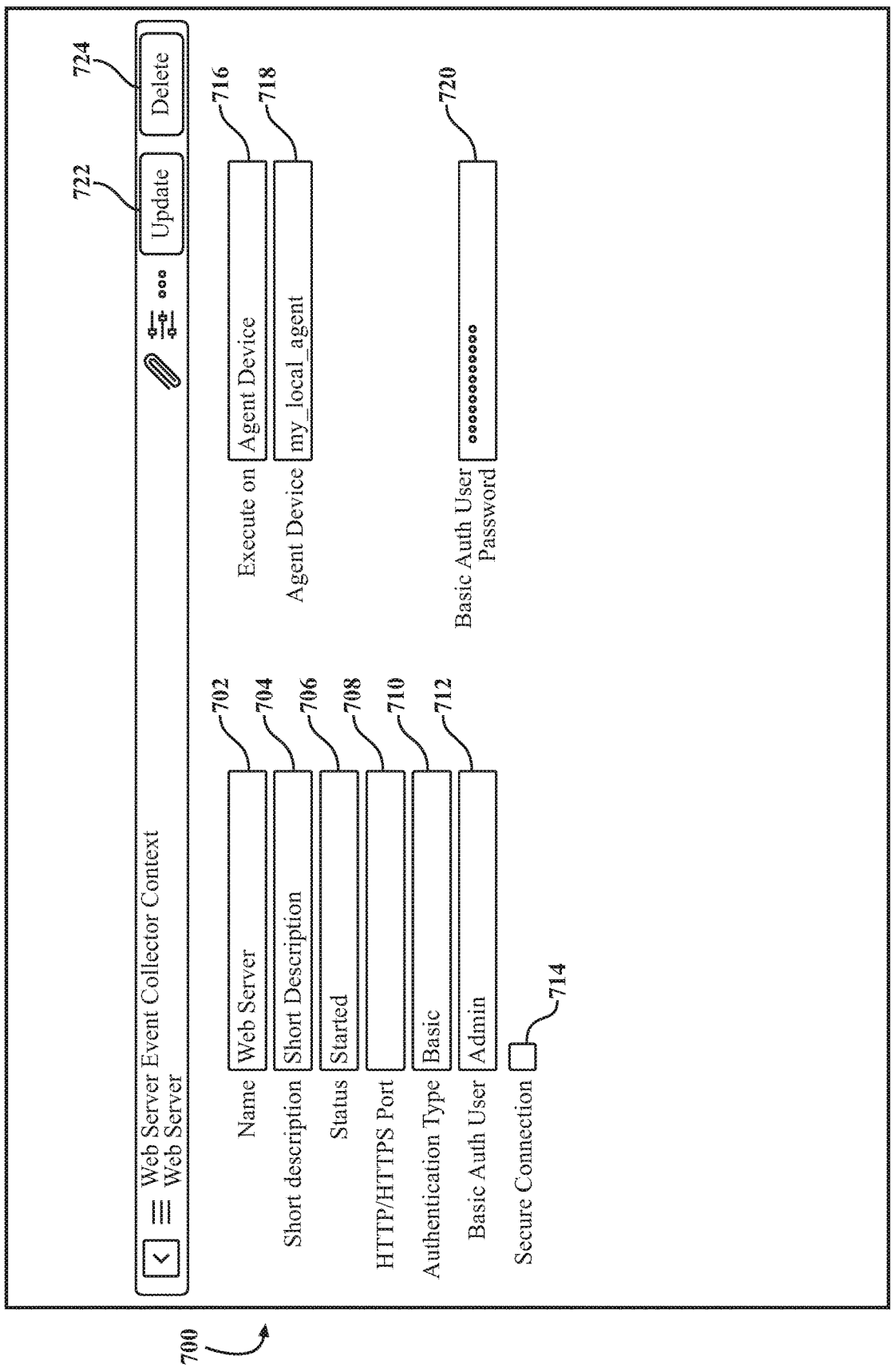
FIG. 7 is an illustration of an example graphical user interface for initializing a web service event collector.

FIG. 7 is an illustration of an example graphical user interface 700 for initializing a web service event collector. The graphical user interface 700 includes fields 702, 704, 706, 708, 710, 712, 716, 718, and 720. The field 702 receives a name or other identifier of the web service event collector. The field 704 receives a description of the web service event collector. The field 706 indicates a status of the web service event collector (e.g., "started"). The field 708 receives a port (e.g., an HTTP/HTTPS port) for receiving event messages. The field 710 receives an authentication type for the web service event collector. The field 712 receives a name or other identifier of an authorized user of the web service event collector. A checkbox 714 receives an indication as to whether the web service event collector uses a secure connection, such as to receive event messages from an event source using the port specified in the field 708. The checkbox 714 may be automatically checked, for example, where input received in the field 708 indicates that an HTTPS or other secure port is used.

The field 716 receives a device type used to execute the web service event collector (e.g., an agent device). The field 718 receives a name or other identifier of a device of the device type specified in the field 716. The field 720 receives a password used to authenticate the user specified in the field 712. A user interface element 722, when interacted with (e.g., clicked), causes user input received in ones of the fields 702, 704, 706, 708, 710, 712, 716, 718, and 720 to be updated. A user interface element 724, when interacted with (e.g., clicked), causes user input received in ones of the fields 702, 704, 706, 708, 710, 712, 716, 718, and 720 to be deleted.

Figure 8:
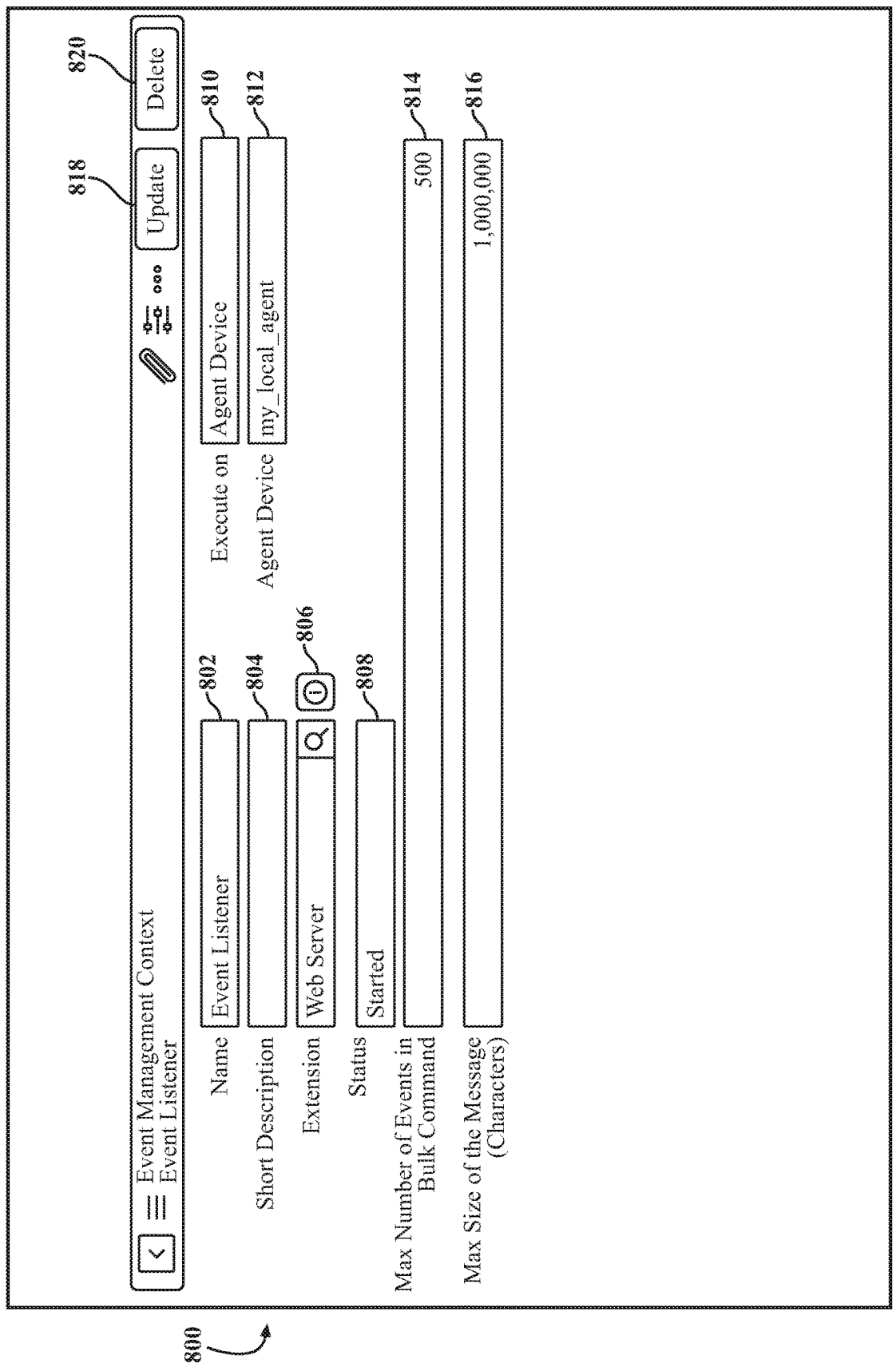
FIG. 8 is an illustration of an example graphical user interface for verifying that a web service event collector is initialized.

FIG. 8 is an illustration of an example graphical user interface 800 for verifying that a web service event collector is initialized. For example, the graphical user interface 800 can be associated with an event listener used by an event management application. The event listener can be a web server used by an agent device to run the web service event collector. The event management application can be software used by an agent device to process events within a computer network. The graphical user interface 800 includes fields 802, 804, 806, 808, 810, 812, 814, and 816. The field 802 receives a name or other identifier of the event listener. The field 704 receives a description of the event listener. The field 806 receives an extension of the event listener, such as for running the web service event collector. The field 808 indicates a status of the event listener (e.g., "started").

The field 810 receives a device type used to execute the web service event collector (e.g., an agent device). The field 812 receives a name or other identifier of a device of the device type specified in the field 810. The field 814 receives a maximum number of events that can be transmitted at a given time, for example, within a batch event message. The field 816 receives a maximum size (e.g., characters) of an event message. A user interface element 818, when interacted with (e.g., clicked), causes user input received in ones of the fields 802, 804, 806, 808, 810, 812, 814, and 816 to be updated. A user interface element 820, when interacted with (e.g., clicked), causes user input received in ones of the fields 802, 804, 806, 808, 810, 812, 814, and 816 to be deleted.

An implementation includes means for receiving, from a management system, a web service event collector including event message transformation instructions and an endpoint definition; means for initializing the web service event collector; means for receiving, using the web service event collector, an event message transmitted from an event source, wherein the event message indicates an event associated with the computer network; means for transforming, using the event message transformation instructions, the event message into a format usable by the management system; and means for transmitting the transformed event message to the management system.

An implementation includes means for transmitting a web service event collector to an agent device within a computer network, wherein the web service event collector includes event message transformation instructions and an endpoint definition; means for receiving a transformed event message from the agent device, wherein the transformed event message indicates an event associated with the computer network and is in a format usable by the management system, wherein the transformed event message was created by the agent device using the event message transformation instructions and an event message received from an event source; and means for determining, based on the transformed event message, an effect of the event on one or more components of the computer network.

All or a portion of the implementations of the systems and techniques described herein can be implemented using a general-purpose computer/processor with a computer program that, when executed, carries out any of the respective techniques, algorithms, routines, or instructions described herein. In addition, or alternatively, for example, a special-purpose computer/processor can be utilized, which can include specialized hardware for carrying out any of the techniques, algorithms, routines, or instructions described herein.

The implementations of computing devices as described herein (and the algorithms, techniques, routines, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if each respective reference were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a processor; and a memory, accessible by the processor, the memory storing instructions, that when executed by the processor, cause the processor to perform operations comprising:
  receiving, from a graphical user interface of a display device, user input indicative of an identifier associated with a computing device in a managed network;
  transmitting, to the computing device, configuration software based on the identifier associated with the computing device, wherein the computing device is configured to transform one or more event messages received from an event source from a first format to a second format after receiving the configuration software, wherein the event source and the computing device are external to the system, and wherein the system is restricted from receiving the one or more event messages from the event source;
  receiving, from the computing device, the one or more event messages in the second format; and
  generating an alert based on the one or more event messages.

2. The system of claim 1, wherein the operations comprise:
  receiving, from the graphical user interface of the display device, user input indicative of an endpoint associated with the computing device;
  wherein the computing device is configured to initialize the endpoint associated with the computing device to receive the one or more event messages from the event source after receiving the configuration software.

3. The system of claim 2, wherein the endpoint utilizes a port associated with the computing device to receive the one or more event messages.

4. The system of claim 1, wherein the operations comprise storing the one or more event messages in a table of a database after receiving the one or more event messages from the computing device.

5. The system of claim 1, wherein the first format is incompatible with the system.

6. The system of claim 1, wherein the first format comprises a markup language format and the second format comprises an object format.

7. The system of claim 6, wherein the markup language format comprises an eXtensible Markup Language format and the object format comprises a JavaScript Object Notation format.

8. A method, comprising:
  receiving, by a management system from a graphical user interface of a display device, a first user input indicative of an identifier associated with a computing device in a managed network and a second user input indicative of an endpoint associated with the computing device;
  transmitting, by the management system to the computing device, configuration software based on the identifier associated with the computing device, wherein the computing device is automatically configured to initialize the endpoint associated with the computing device to receive one or more event messages from an event source and transform the one or more event messages received from the event source from a first format to a second format after receiving the configuration software, wherein the event source and the computing device are external to the management system;
  receiving, by the management system from the computing device, the one or more event messages in the second format; and
  generating, by the management system, an alert based on the one or more event messages.

9. The method of claim 8, wherein the management system is restricted from receiving the one or more event messages from the event source.

10. The method of claim 8, comprising transmitting, by the management system to the computing device, an update to the configuration software, wherein the computing device is automatically configured to transform one or more additional event messages received from the event source from the first format to a third format after receiving the configuration software.

11. The method of claim 10, comprising receiving, by the management system from the computing device, the one or more additional event messages in the third format.

12. The method of claim 8, comprising determining, by the management system, that a new event source is present in the managed network.

13. The method of claim 12, comprising transmitting, by the management system to the computing device, an update to the configuration software, wherein the computing device is automatically configured to transform one or more additional event messages received from the new event source from a third format to the second format.

14. The method of claim 8, wherein the one or more event messages are encrypted before the management system receives the one or more event messages.

15. A non-transitory, computer-readable medium, comprising instructions that when executed by one or more processors, cause the one or more processors to perform operations comprising:
  receiving, from a graphical user interface of a display device, user input indicative of an identifier associated with a computing device in a managed network and an endpoint associated with the computing device;
  transmitting, to the computing device, configuration software based on the identifier associated with the computing device, wherein the computing device is configured to initialize the endpoint associated with the computing device to receive one or more event messages from an event source and transform the one or more event messages received from the event source from a first format to a second format after receiving the configuration software, wherein the event source and the computing device are external to a system that includes the one or more processors, and wherein the one or more processors are restricted from receiving the one or more event messages from the event source;
  receiving, from the computing device, the one or more event messages in the second format; and
  storing the one or more event messages in a table of a database.

16. The non-transitory, computer-readable medium of claim 15, wherein the operations comprise generating an alert based on the one or more event messages.

17. The non-transitory, computer-readable medium of claim 15, wherein the endpoint utilizes a port associated with the computing device to receive the one or more event messages.

18. The non-transitory, computer-readable medium of claim 15, wherein the first format comprises a markup language format and the second format comprises an object format.

19. The non-transitory, computer-readable medium of claim 15, wherein the one or more processors are unable to process the one or more event messages in the first format.

* * * * *